No. 640,429. Patented Jan. 2, 1900.
J. A. STODDART.
FISH FIBERING MACHINE.
(Application filed June 20, 1899.)
(No Model.)
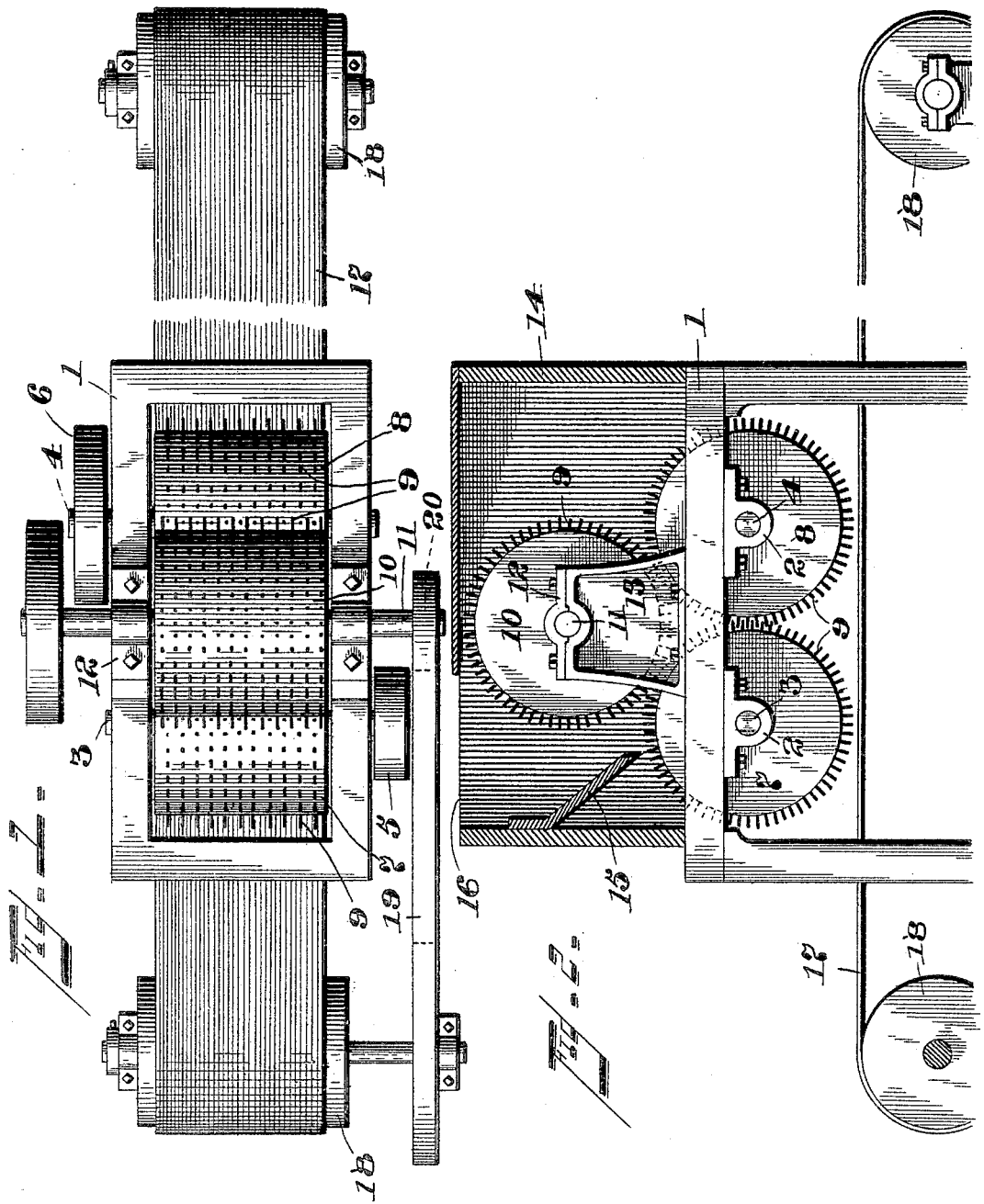
WITNESSES
INVENTOR

UNITED STATES PATENT OFFICE.

JOHN A. STODDART, OF GLOUCESTER, MASSACHUSETTS.

FISH-FIBERING MACHINE.

SPECIFICATION forming part of Letters Patent No. 640,429, dated January 2, 1900.

Application filed June 20, 1899. Serial No. 721,256. (No model.)

*To all whom it may concern:*

Be it known that I, JOHN A. STODDART, a citizen of the United States, residing at Gloucester, in the county of Essex and State of Massachusetts, have invented certain new and useful Improvements in Fish-Fibering Machines; and I do hereby declare the following to be a full, clear, and exact description of the invention, such as will enable others skilled in the art to which it appertains to make and use the same.

My invention relates to machines for fibering or shredding animal or vegetable food and is particularly well adapted for fibering or shredding fish, the object being to quickly and effectively shred the fish and to convey the shredded portions to any desired place.

It consists in the construction, combination, and arrangement of parts, as will be hereinafter fully described and claimed.

In the accompanying drawings, Figure 1 represents a top plan view of my improved fish-fibering machine with the inclosing casing removed; and Fig. 2 represents a side elevation of the machine, partly in section.

Referring to the drawings, 1 designates an iron frame, to which are removably secured journal-boxes 2 2, having shafts 3 and 4 mounted therein. The shaft 3 carries a small pulley 5 and the shaft 4 a large pulley 6 to communicate motion, through mechanism not shown, to the said shafts, the pulleys being operated by any suitable power mechanism. Rollers or cylinders 7 and 8 are mounted on the shafts 3 and 4 to revolve therewith, the rollers being provided on their peripheries with studs or projections 9. The rollers are so located that the studs will intermesh or pass between each other. The roller 7, being provided with the smaller pulley, will operate more rapidly than the roller 8; but the latter, 8, will not permit the fish to pass through the machine too rapidly. Another roller 10 is mounted on a shaft 11, journaled in bearings 12 on a standard 13, secured to the frame 1, the said roller being also provided with studs or projections 9 and so mounted that the studs will intermesh with or pass between the studs on the other rollers. The roller 10 is inclosed within a casing 14, mounted on the frame 1, said casing being open at the bottom and at one end to form a feed-hopper 16 for the reception of fish. The casing 14 is provided with a guide 15, adapted to direct the fish onto the studs of the rollers.

From this description it will be seen that the fish after having been skinned and large bones removed and cut up into pieces about six inches square can be inserted through the feed-hopper 16, and the guide 15 will direct it between the rollers 3 and 10, whence it passes between the rollers 3 and 4, the studs on the rollers cutting the fish into pieces and preparing it for market. The rollers all run at different rates of speed, and the rollers 3 and 4 run in opposite directions. The object of having the rollers run at different speeds is that the fish may not pass through the machine too rapidly and that they may be thoroughly fibered. After the fish pass between the rollers they are deposited onto endless conveyer 17, preferably of canvas or other suitable material, which runs over a drum or cylinder 18 at each end, power being transmitted to it by a belt 19 from a pulley 20 on the end of the shaft 11. The conveyer 17 is directly arranged below the machine and moves very slowly to enable an operator to pick bones or other undesirable matter from the fish as it is conveyed away.

It is to be understood that the conveyer may be of any length to transport the fish scrap, which when deposited on the conveyer is of a flaky nature, to a point where it may be deposited in any suitable receptacle.

From the description it will be apparent that my device is of great simplicity in construction and will be effective in operation and that the fish after having been subjected to the action of my machine will be ready for market. By the use of three rollers the fish will be completely fibered, thus rendering it unnecessary to pass them twice through the machine, and also the work will be done in less time than would be required if two rollers were employed to do the same amount of work.

Having now described my invention, what I claim as new, and desire to secure by Letters Patent, is—

1. In a fish-fibering machine, the combination with a supporting-frame, of a pair of rollers arranged in horizontal alinement, one of which rollers is adapted to travel at a higher rate of speed than the other, a third roller supported above the pair of alined rollers, each roller being provided on its periphery, with studs or projections, which, in the operation of the rollers, intermesh, an open-bottom casing adapted to partially inclose the upper roller, a guide secured to the said casing to direct the fish between the rollers, and a feed-hopper arranged over the guide, substantially as described.

2. In a fish-fibering machine, the combination with a supporting-frame, of a pair of rollers arranged in horizontal alinement, a third roller supported above the pair of alined rollers, each roller being provided on its periphery with studs or projections, which, in the operation of the rollers, intermesh, an open-bottom casing, adapted to partially inclose the upper roller, a guide secured to the said casing to direct the fish between the rollers, a feed-hopper arranged over the guide, and means for imparting a higher rate of speed to one of the horizontally-alined rollers than to the other, substantially as described.

In testimony whereof I hereunto affix my signature in presence of two witnesses.

JOHN A. STODDART.

Witnesses:
WILLIAM V. HUTCHINGS,
WILLIAM W. FRENCH.